US005638442A

United States Patent [19]

Gargiulo et al.

[11] Patent Number: 5,638,442

[45] Date of Patent: Jun. 10, 1997

[54] METHOD FOR REMOTELY INSPECTING A POSTAGE METER

[75] Inventors: Joseph L. Gargiulo, Trumbull; Richard W. Heiden, Huntington; Robert G. Arsenault, Stratford, all of Conn.

[73] Assignee: Pitney Bowes Inc., Stamford, Conn.

[21] Appl. No.: 518,442

[22] Filed: Aug. 23, 1995

[51] Int. Cl.[6] .......... H04L 9/00

[52] U.S. Cl. .......... 380/2; 380/21; 380/51

[58] Field of Search .......... 380/2, 21, 51, 380/24, 45, 47, 49; 364/464.02, 550

[56] References Cited

U.S. PATENT DOCUMENTS

| | | | |
|---|---|---|---|
| 4,812,965 | 3/1989 | Taylor | 364/550 |
| 4,812,992 | 3/1989 | Storace et al. | 364/464.02 |
| 4,907,271 | 3/1990 | Gilham | 380/25 |
| 5,077,792 | 12/1991 | Herring | 380/24 |
| 5,081,675 | 1/1992 | Kittirutsunetorn | 380/49 |
| 5,548,648 | 8/1996 | Yorke-Smith | 380/49 |

*Primary Examiner*—Thomas H. Tarcza
*Assistant Examiner*—Carmen D. White
*Attorney, Agent, or Firm*—Angelo N. Chaclas; Charles G. Parks, Jr.; Melvin J. Scolnick

[57] ABSTRACT

The postage meter terminal has the ability to telecommunicate with a remote central computer for the principal purpose of remotely resetting the funding registers of the postage meter terminal. During the telecommunication and subsequent to completing meter recharge, the postage meter terminal can be remotely inspected by the central computer. The terminal includes a microprocessor control system which is programmed to generating inspection data and store that data in a memory unit. The microprocessor control system also includes a random number generator for generating a random number within a limited range. Each number within the range of random number selections corresponds to a respective scrambling technique executable by the microprocessor system. The method of remote inspection is carried out by the microprocessor control system storing desired inspection data in the terminal memory unit generating a random number and then creating a data word of the inspection data and the random number. The data word is then partitioned into a first and second partition. The first partition of the data word including the random number selection at a predetermined bit location within the first data word portion. The second partition of the data word is scrambled pursuant to the scrambling techniques which corresponds to the random number. The data word may then be encrypted utilizing the encryption key which was generated during the remote reset process and communicating the data to the central computer via the communication port. The central computer can then decrypt the encrypted data word since it is aware of the encryption key used to complete the remote meter reset. The central computer then retrieves the random number and descrambles the second portion of the data work according. The central computer is thereby informed of the inspection data for that particular postage meter terminal.

7 Claims, 3 Drawing Sheets

METHOD FOR REMOTELY INSPECTING A POSTAGE METER

BACKGROUND OF THE INVENTION

The present invention relates to postage metering systems wherein funds are credited to a secure electronic vault within the postage meter and wherein funds are accounted for by debiting from the vault in accordance with the postage value during each posting transaction and, more particularly, to means of inspecting the postage meter to detect any attempts to tamper with the vault for the purpose of fraudulently obtaining a posting transaction without accounting for dispensed funds.

A known postage meter system is comprised of a printing unit in electronic communication with a micro-controller system located within a secure housing. The micro-controller system is comprised of a number of memory units, for èxample, a program memory and number of non-volatile accounting memories. The micro-controller system includes electronic provisions for securing accounting data within the non-volatile accounting memories which accounting data represents the funding transactions performed by the meter. Generally, this security has been provided by physically placing the printing unit and the accounting vault within the same secure housing and providing tamper revealing devices, that is, devices which physically reveal if the housing has been tampered with, such as, brake-off screws and paper seal strategically located at access points on the housing. The micro-controller control system also includes programming to permit secure telecommunication between a micro-controller system and a remote location such as a data center. Communication between a data center and the respective meter is undertaken for the principle purpose of recharging funding registers within the non-volatile accounting memory units of the meter. Security for the telecommunications is generally provided by utilizing encryption techniques and special communication protocols, along with a process of account reconciliation between information in the meter's non-volatile memories and the data center.

To insure the integrity of the postage meter, it is known to require periodic visual inspections of every meter in public use for the purpose of detecting any evidence of tampering. The inspection process, as presently undertaken, presents several disadvantages. The process requires the maintenance of costly inspection procedures and personnel of both the manufacturer, in the case of on-site inspection, and the postal authorities, in maintaining postal inspection centers. Visual inspections are less reliable to detect electronic invasion of the accounting system. The cost and logistical burdens of visual inspection are substantially greater with the introductions of new technologies for developing electronic postage meters which are particularly intended for use by small businesses and individuals.

A collateral concern affecting meter operation relates to the proper operation of the meter. For example, a postage meter printing system may periodically operate improperly which can result in the meter accounting for expended funds when in fact the posting funds were not printed due to printer malfunction. The periodic malfunction or mis-function of the postage meter can cause improper funds accounting which generally represent lost funds to the user.

It is known to provide the meter micro-controller system with the capability of maintaining an error log of detected system errors. It is known to provide a system repair person, with the aid of special equipment, to communicate with the micro control system of a meter through an external interface port during an on-site service call. The service repair person is then allowed to access the error log and retrieve the information stored therein. From that information, it is hoped that proper machine operation can be verified and potential system operation malfunction anticipated. By anticipating the onset of system malfunction, it is intended the occasions promoting system errors can be immediately corrected and, thereby, minimize the potential for system error resulting in lost funds. Further, in relationship to specific types of errors which have already occurred, verification of the error condition may permit some funds recovery.

SUMMARY OF THE INVENTION

It is an objective of the present invention to present an electronic method of inspecting the operation and security of electronic postage meters which are equipped with external communication channels.

It is a further objective of the present invention to present an electronic method of inspecting the operation and security of an electronic postage meter wherein the inspection can be carried remote from the site of the meter utilizing external communication.

It is a further objective of the present invention to present an electronic method of inspecting the operation and security of an electronic postage meter wherein the inspection can be carried remote from the site of the meter utilizing external communication with a data center wherein the inspection is conducted during a recharge operation in a manner transparent to the meter operator.

A postage metering system particularly suited includes a secure printing unit in electronic communication with a secure accounting unit. Security can be provided for the printing unit and accounting unit or vault by any suitable conventional or non-conventional manner, for example, by placing the printing unit and accounting unit within a secure housing. Alternatively, the printing unit and vault may be provided independent security, and security between the printing unit and the accounting vault may be provided by utilizing any suitable conventional or non-conventional encoding and/or encryption techniques. An unsecured human interface and microprocessor control system may be provided between the secured printing unit and vault for, among other things, providing control instruction to the secure printing unit and the vault. However, the microprocessor system is not able to modify secure communications between the secure printer and vault. One such system is described in U.S. Pat. No. 4,802,218, entitled "Automated Transaction System."

The automated postage transaction system as described in U.S. Pat. No. 4,802,218 employs a non-volatile card memory for maintaining an account balance and a postage meter terminal for dispensing an article of value, e.g., postage indicia onto a presented envelope and debits the card's balance in accordance with the postage value.

The funds for dispensing postage is stored in the smart card vault which includes a microprocessor with non-volatile memory. The postage meter terminal contains the print head, a user interface and a microprocessor with associated non-volatile memory. In addition, a modem may be included for permitting the postage meter terminal to telecommunicate with a data center under microprocessor control. The funds in the smart card can only be transactionally accessed during each meter trip and meter refill. An Audit Code is created for each transaction, i.e., a meter trip or meter refill, and a record of the Audit Code is stored in the non-volatile memory units in other subsystems. Included in the Audit Code are the descending register, ascending register, piece count, date, time, vault ID, and a two bit random number. This data is assembled into two 64-bit strings. One of the 64-bit string is stored in clear text. The other 64-bit string is scrambled then encrypted using a key that is derived from an encryption key stored inside the smart card. The 64-bit string that is scrambled and encrypted is preferably comprised of the funding registers and piece count. The encryption key is the same that is employed in the standard digital encryption method, such as, Digital Encryption Standard, publication No. 49, by the United States National Bureau of Standards used to encrypt recharging information exchanged between the meter and the data center. During a remote refill process the scrambled and encrypted information of the 64-bit data string is transmitted to the data center, decrypted and unscrambled by reversing the process. The accounting information can then be verified. In like manner, the system error messages can be scrambled and encrypted for communication to the data center during a refill operation. This enables the error messages of the particular postage meter to be analyzed at the data center. It is now apparent that the described process may able be used to obtain meter performance information.

DETAILED DESCRIPTION OF THE PREFERRED EMBODIMENT

Figure 1:
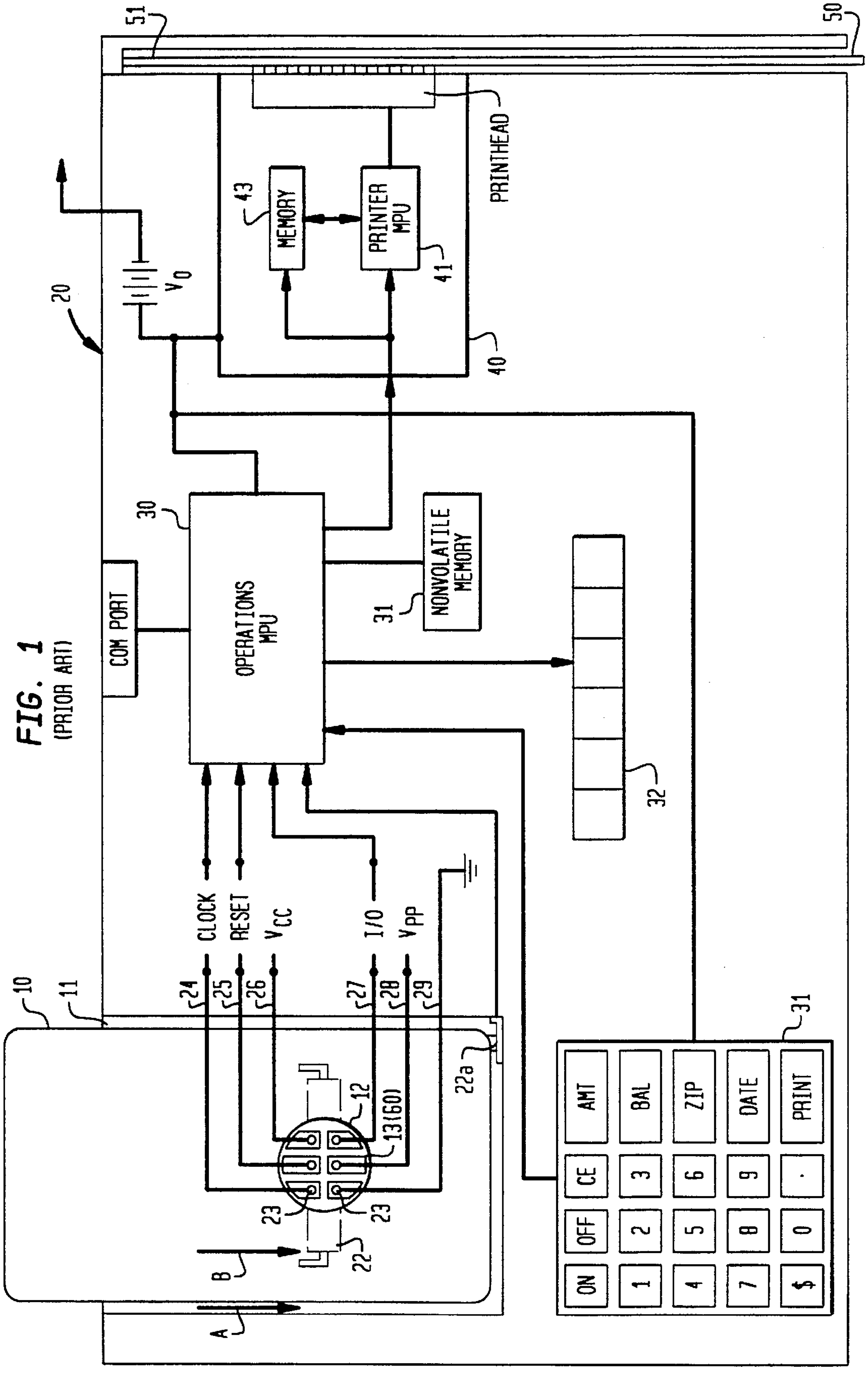
FIG. 1 (PRIOR ART)
FIG. 1 is a schematic of a prior art postage meter utilizing a card type vault.

Referring to FIG. 1, a known postage meter system of one suitable configuration includes a microprocessor card 10 having non-volatile storage means adapted to be inserted in a card insertion slot 11 of an automated transaction terminal 20, for the purpose of the preferred embodiment hereafter also referred to as meter base or base. A suitable microprocessor card 10 is manufactured by Gemplus Card International. The card 10 has a contact section 12 supporting a number of contacts 13 connected to the printout leads of an IC chip including a microprocessor unit (card MPU) 60 laminated beneath a protective layer of the card contact section 12. The contacts 13 are mated with corresponding contacts 23 of a terminal contact section 22 upon insertion of the card 10 into the slot 11 in the direction indicated by arrow A. As the card is inserted, its leading edge abuts a part of the terminal contact section 22 which is moved in the same direction, indicated by arrow B, so as to merge in operative electrical contact with the card contact section 12. A trip switch 22*a* is provided at the base of slot 11, and triggers a start signal to an operations microprocessor (terminal MPU) 30 when the card has been fully inserted in position in the slot.

The card MPU 60 executes an internally stored (firmware) program to check whether a requested transaction is authorized and, prior to debiting the card account balance, to perform a secure handshake recognition procedure (described further below) with a microprocessor in the terminal. Although the handshake procedure can be performed with an operations microprocessor for the terminal, or one remote to the terminal, it is preferred in the invention that the procedure be performed with a secure microprocessor embedded in the actual value dispensing section of the terminal. The value dispensing section is a separate element in the terminal, and its microprocessor is made physically secure, such as by embedding it in epoxy, so that any attempt to tamper with it would result in rendering the value dispensing section inoperative. For the postal transaction terminal of the invention, the microprocessor is embedded in the printer unit which prints the postmark.

The terminal contacts 23 are connected with the functional parts of the terminal, including a Clock synchronizing connection 24, a REST connection 25, an operational voltage Vcc connection 26, an Input/Output (I/O) port 27, an EPROM-writing voltage Vpp connection 28, and a ground connection 29. The terminal MPU 30 controls the interface with the card and the operation of the various parts of the terminal, including a keyboard 31, a display 32, such as an LCD, and a postmark printer 40, which is the value dispensing section of the terminal. A power source Vo is provided by a battery and/or an external AC or DC line to power the various parts of the terminal.

The printer 40 has a microprocessor unit (printer MPU) 41 which individually and uniquely controls the operation of a print head 42, such as an electrothermic, ink jet, bubble jet or other suitable printing techniques. The MPU 41 executes an internal program (firmware), like the card microprocessor, so that it cannot be tampered with from the outside. The printers MPU's internal program includes unique encryption algorithms parallel to those stored in the card's microprocessor, installed by the manufacturer, so that the print MPU can execute a secure handshake recognition procedure with the card's microprocessor to authorize a requested transaction. The MPU 41 is also formed integrally with the print head 42, such as by embedding in epoxy or the like, so that it cannot be physically accessed without destroying the print head. Thus, the print head 42 of the postage metering terminal 20 can only be operated through the MPU 41, and will print a postmark only when the handshake recognition procedure and a postmark print command have been executive between the card MPU and the printer MPU 41.

When a terminal is to be installed by the issuer in a location or distributed to a retail intermediary for field use, the issuer may also execute a validation procedure for the terminal similar to that for the card. A secret key number may be written in the secret memory zone of the print MPU 41, so that postage printing transactions can only be executed with cards provided with the corresponding secret key number. Thus, cards validated by another issuer, even though obtained from the same manufacturer, will not be usable in the first-mentioned issuer's machines. The terminal MPU may of course be used for the handshake recognition procedure. However, it is preferable to have the procedure executed by the part which is actually dispensing the article of value, and to leave the terminal MPU operable for general terminal operations.

During normal operation, the user inputs on keypad 31 the amount of postage requested and, as a further option, the zip code of the sender's location and the date. As the information is supplied in sequence, i.e., "Amount", "Zip", and "Date", it is displayed on display 32 for confirmation. Alternatively, the date may be maintained by the terminal MPU 30, and displayed for user confirmation. When all the correct information has been entered, an edge of an envelope 51 to be mailed, or a label or mailing form to be attached to an item to be mailed, is inserted in a slot 50 on one side of the postage metering terminal 20. The movement of the label or envelope may be controlled to bring it in registration with the print head, as provided in conventional metering machines. The user then presses the "Print" key to initiate a postage printing transaction. Alternatively, postage printing may be triggered automatically by a sensor being enabled by the envelope's presence.

A basic principle of the invention is that the actual execution of a value-exchanging transaction is securely controlled by a mutual handshake recognition procedure between a secure microprocessor maintaining the card account balance and a secure microprocessor controlling the value dispensing operation. The card's MPU must recognize the value dispensing section's microprocessor as valid, and vice versa, in order to execute a transaction. The card and the value dispensing section therefore can each remain autonomous and protected against counterfeiting or fraudulent use even if the security of the other has been breached.

Figure 2A:
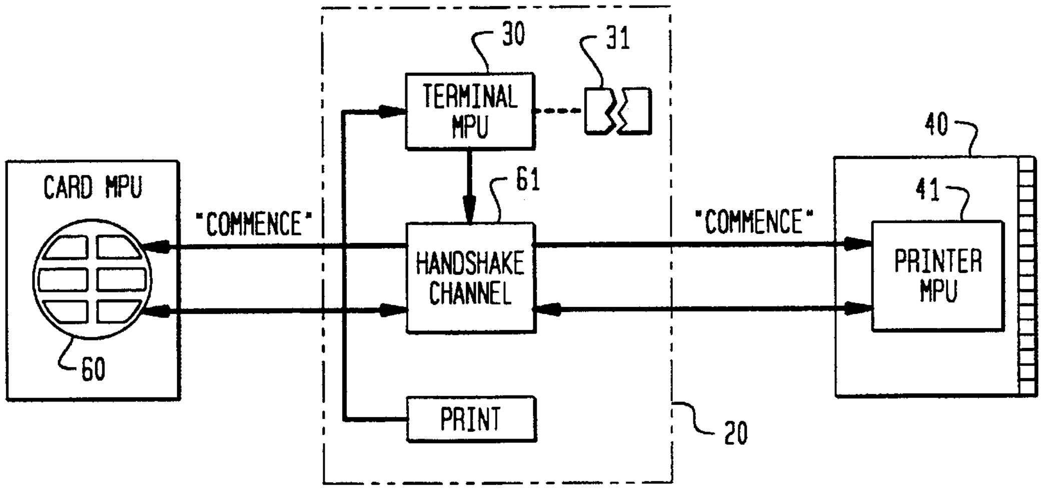
FIG. 2A (PRIOR ART)
FIGS. 2*a* and 2*b* is a schematic of the communication path between the card vault, meter terminal and printer unit.

A known and suitable two-way encrypted handshake will now be described. However, any mutual handshake procedure by which the card and dispensing microprocessor can recognize the other as authorized to execute a requested transaction. In the preferred postage terminal embodiment, the handshake procedure is executed between the card MPU 60 and the printer MPU 41. As illustrated schematically in FIG. 2*a*, when the "Print" key signal is received by the terminal MPU 30, the latter opens a channel 61 of communication between the card MPU 60 and the printer MPU 41. A "commence" signal and the amount of the requested transaction, i.e. postage, is then sent from the terminal MPU 30 to the card MPU 60, and a similar "commence" signal to the printer MPU 41, in order to prepare the way for the handshake procedure.

Figure 2B:
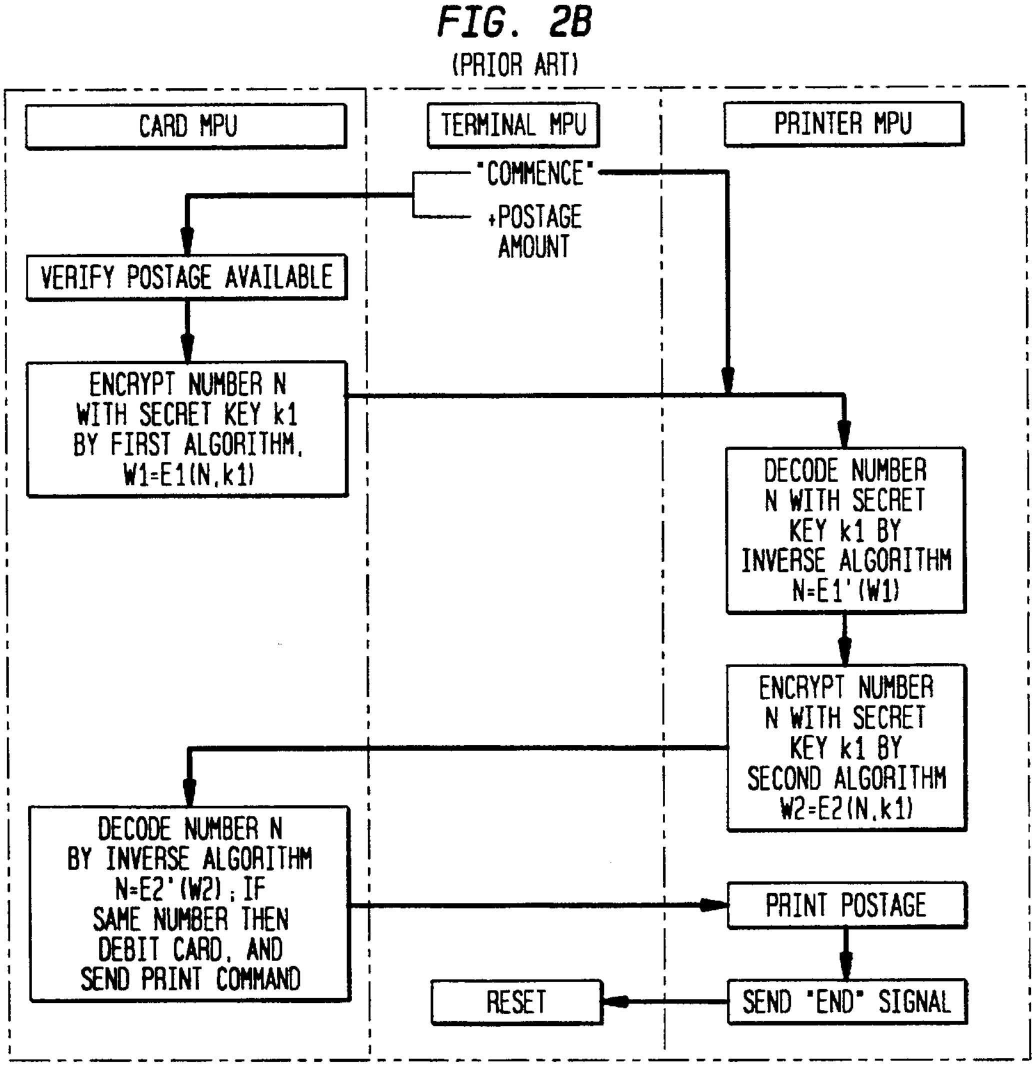
FIG. 2B (PRIOR ART)

Referring to FIG. 2*b*, the card MPU 60 initiates the handshake procedure upon receipt of the "commence" signal by first verifying if the requested amount is available for the transaction. As an advantageous feature of the invention, the card MPU 60 checks the available balance of the card and (if implemented in the card's program) whether the requested transaction is within any limits specified by the card issuer. Upon verifying that the requested transaction is authorized, the card MPU 60 encrypts an object number N, which may be a randomly generated number, with a key number k1 (which may be the user's PIN) stored in the secret zone of its memory by a first encryption algorithm E1 and sends the resultant word W1 through the handshake channel 61 of terminal MPU 30 to the printer MPU 41.

Upon receipt of the word W1, the printer MPU 41 decodes the number using the same k1 by the inverse algorithm E1'. The number k1 may be a secret key stored in the printer MPU's memory at the time of validation, or in an open system, it may be the PIN entered by the user on the terminal, or a combination of both. The printer MPU 41 then encrypts the decoded number with the number k1 by a second encryption algorithm E2 to send a second word W2 back to the card MPU 60.

Upon receipt of the word W2, the card MPU 60 decodes the number again using the key number k1 by the inverse of the second algorithm E2', and compares the decoded number with the number it used in the first transmission. If the numbers match, the handshake procedure has been successfully completed, and the card and printer MPUs have recognized each other as authorized to execute the requested transaction.

Complementary, the same procedure can be repeated with the printer MPU 41 sending an encrypted random number and then checking whether it matches the number returned by the card MPU 60. This results in a complementary verification of the card MPU to the printer MPU.

The card MPU then debits the postage amount from the card balance, and then sends a print command and the postage amount to the printer MPU. The printer MPU prints the postage on envelope 51, in cooperation with the terminal MPU 30. The printer MPU then sends an "end" signal to the terminal MPU 30, which accordingly switches off the handshake channel 61 and resets itself to receive the next transaction.

In accordance with the present invention, during each posting operation, or any other time that an inspection request is made, audits are performed and the result recorded in the non-volatile memory 31 outside of the vault. Referring to Table 1, one of the audits is comprised of funding and related information such as vault identification number, date, time, descending register value, ascending register value and piece count. This information along with generated random bits are combined to form a first 64-bit string. In like manner, system performance information may be recorded to develop a second 64-bit string, such as, system error log history, trip count, indicia check sum, etc. It should be appreciated that a record may be made of any desired information and used to derive the second 64-bit string representative of that information. Both the first and second 64-bit strings are stored in the memory unit 31 located in the non-volatile memory in one or more subsystems. An equally preferred embodiment stores the first and second 64-bit strings in the non-volatile memory associated with the print microprocessor unit 41.

TABLE 1

| | AUDIT CODE | | | | | | | |
|---|---|---|---|---|---|---|---|---|
| | Clear | | | | | Encrypted | | |
| | random bits | random number | Vault ID | Date | Military Time | Descending Register | Ascending Register | Piece Count |
| Range | — | 0–3 | XXXXX | XX | 0-2369 | XXXXX | XXXXX | XXXX |
| Bits | 10 | 2 | 24 | 16 | 12 | 23 | 24 | 17 |
| Total | 64 Bits | | | | | 64 Bits | | |

TABLE 1-continued

INTEGRITY CODE

| | Clear | | | | | Encrypted | | |
|---|---|---|---|---|---|---|---|---|
| | random bits | random number | Printer ID | Date | Rom Checksum | Head error log | Indicia checksum | X timing |
| Range | | 0–3 | XXXX | XXX | XX | XXXXX | XXXXX | XXXX |
| Bits | 10 | 2 | 24 | 16 | 12 | 23 | 24 | 17 |
| Total | | | 64 Bits | | | | 64 Bits | |

Figure 3:
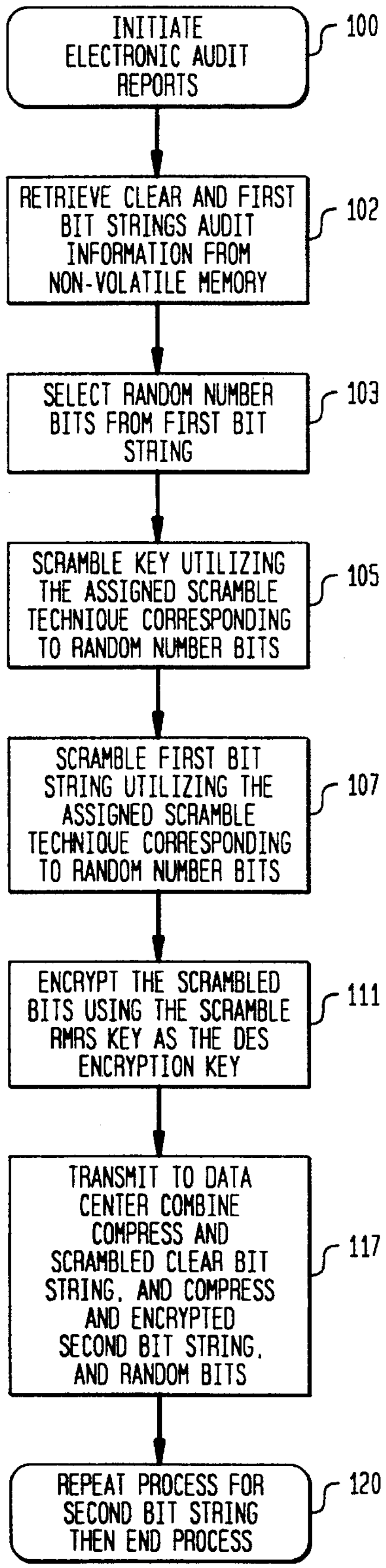
FIG. 3 is a flow chart of the method of generating an audit code for transmission to a data center.

Referring to FIG. 3, the microprocessor may be programmed to initiate an electronic audit at step 100. The system then retrieves the first bit string from the base non-volatile memory 31 at step 102. The random number of the first bit string is selected at step 103. The key utilized for remote meter reset described above is then scrambled pursuant to an assigned technique which corresponds to the random number at step 105. In like manner, at step 107, the second bit string is scrambled using the scramble techniques corresponding to the random number. The scrambled bits are then encrypted using the scrambled key as the digital encryption key. The encrypted information is then compressed using any standard compression techniques and transmitted to the data center along with the random number at step 117. The process is then repeated for the first bit string using the selected random number and the process ends at step 120. The identical procedure may then be carried out with respect to the electronic integrity code to produce an integrity report.

It is now appreciated that the data center can reverse the process to derive the initial information and compare that information against its recorded information for verification of the accounting information and utilize the performance information to determine the operating status of the meter.

The provided description represents the preferred embodiment of a device provided for communicating audit information to a data center. It should be appreciated that the preferred method of communicating the described information will operate with any equally suitably postage meter embodiment. The scope of the invention is described by the appendix claims.

What is claimed is:

1. A method of remote inspection of a terminal by a remotely located central computer, said terminal having a microprocessor for processing operating data and generating inspection data in accordance with program data stored in a program memory, a data store memory for storing inspection data, a random number generator and a communication port for permitting remote communication between said terminal and said central computer under control of said microprocessor, said central computer having a communication port, said microprocessor being programmed to perform the steps of:

limiting said random number generator to N-selections, storing N-selections of scrambling techniques in said program memory, one of said scrambling techniques corresponding to a respective of said random number generator selections, generating a random number selection, creating a data word of said inspection data and said random number selection, partitioning said data word into a first and second partition, said first partition of said data word including said random number selection at a given bit location within said first data word portion, scrambling said second partition of said data word pursuant to one of a plurality of techniques corresponding to said random number selection, communicating said data to said central computer via said communication port.

2. A method of remote inspection of a terminal by a remotely located central computer as claimed in claim 1, wherein said central computer being programmed to perform the steps of:

storing N-selections of descrambling techniques, one of said scrambling techniques corresponding to a respective of said random number generator selections, receiving said data word from said terminal, locating said random number selection at said bit location of said first data word portion, applying said descrambling techniques to said scrambled second portion of said data word corresponding to said located random number selection.

3. A method of remote inspection of a terminal by a remotely located central computer as claimed in claim 2, further comprising the step of said terminal encrypting said data word utilizing a preselected encryption key prior to communication to said data word to said central computer.

4. A method of remote inspection of a terminal by a remotely located central computer as claimed in claim 3, further comprising the step of said central computer decrypting said received data word utilizing said selected encryption key just prior to locating said random number selection.

5. A method of remote inspection of a terminal by a remotely located central computer as claimed in any one of the previous claims 1–4 wherein said terminal is a postage meter having stored in data stored memory transaction information comprising said first data word portion and transaction accounting information comprising said second data word portion.

6. A method of remote inspection of a terminal by a remotely located central computer as claimed in claim 5, wherein said terminal is a postage meter having stored in data store memory meter operating performance information.

7. A method of remote inspection of a terminal by a remotely located central computer as claimed in claim 4, wherein said terminal is a postage meter having stored in data store memory meter operating performance information.

* * * * *